Nov. 16, 1971  D. W. BIRCH  3,619,864
THERMOPLASTIC SHEET FORMING MACHINE
Filed Sept. 24, 1969  3 Sheets-Sheet 1

INVENTOR.
DAVID W. BIRCH
BY
*Bean+Bean*
ATTORNEYS

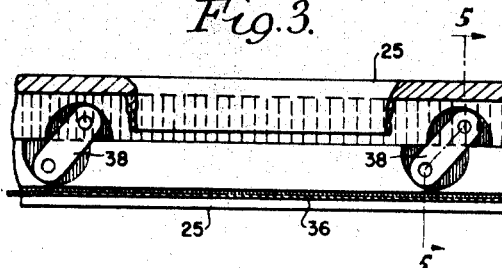
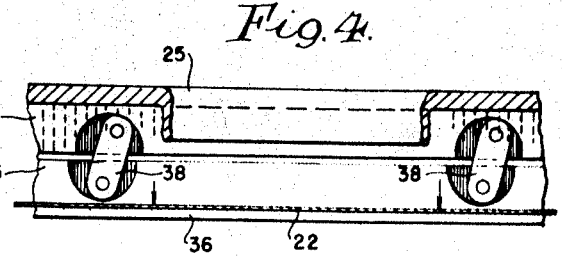
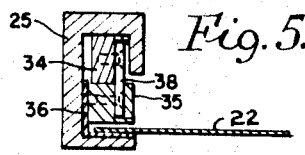
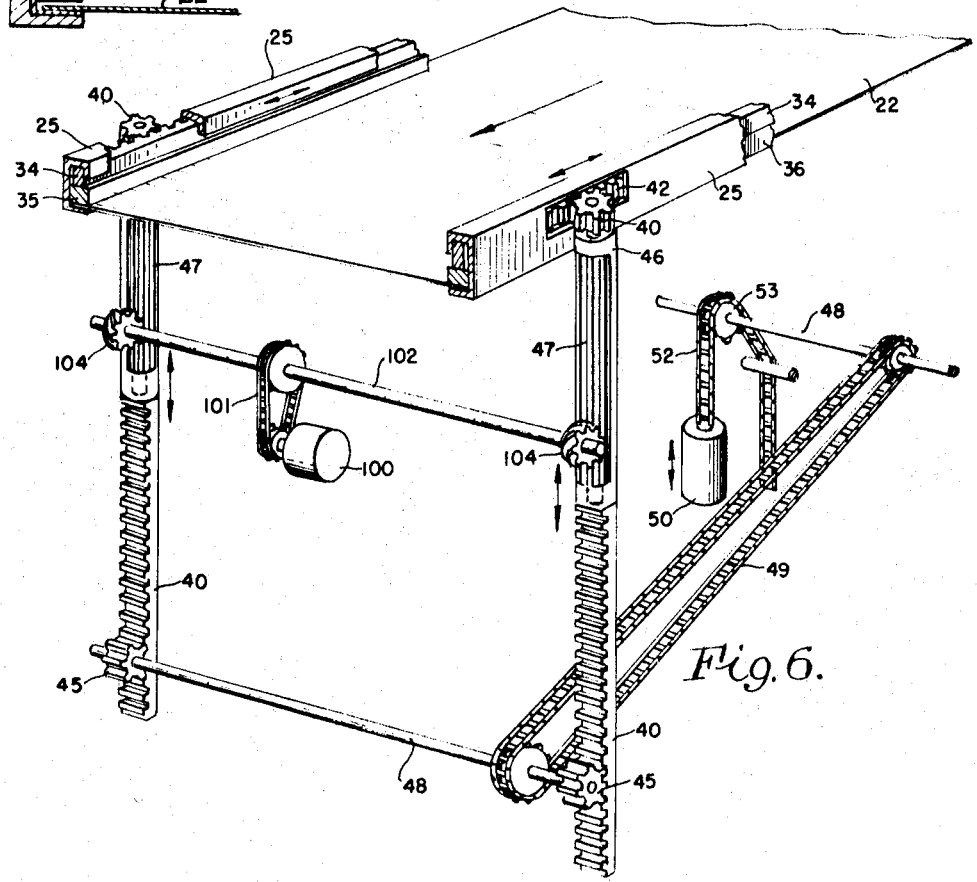
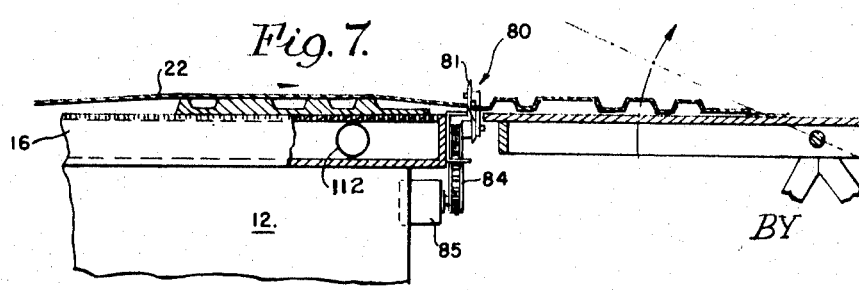
INVENTOR.
DAVID W. BIRCH

INVENTOR.
DAVID W. BIRCH
BY
Bean & Bean
ATTORNEYS

United States Patent Office 3,619,864
Patented Nov. 16, 1971

3,619,864
THERMOPLASTIC SHEET FORMING MACHINE
David W. Birch, East Aurora, N.Y., assignor to
Essex Recon Corporation, Lancaster, N.Y.
Filed Sept. 24, 1969, Ser. No. 860,674
Int. Cl. B29c 17/04, 17/10
U.S. Cl. 18—19 F
4 Claims

ABSTRACT OF THE DISCLOSURE

A thermoplastic sheet molding machine is provided, comprising a perforated top table supporting a molding pattern; the interior of the table being subjected selectively and alternatively to vacuum and pressured air condition. A plastic sheet transport frame is provided including means for gripping opposite side edges of a stock sheet to be molded and holding it in horizontal attitude above the table. A radiant heater is mounted above the transport frame, and the power supply means is separately operable to move the transport frame and heater vertically on the machine relative to the table. A vacuum source and a cooling air supply are selectively operable through the table and act upon the sheet in process to provide an improved thermoplastic sheet molding operation.

GENERAL DESCRIPTION OF THE INVENTION

Figure 1:
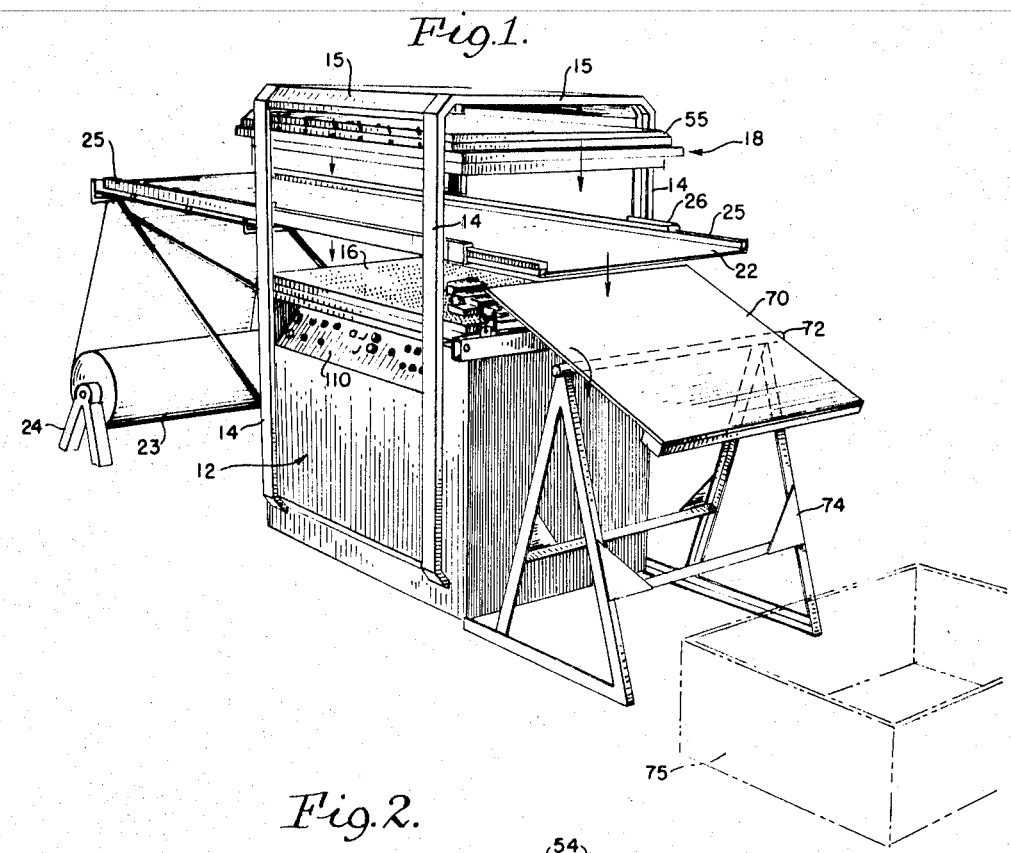

The invention relates to an improved method and means for molding contoured articles from thermoplastic sheet material; whereby the plastic sheet stock material is handled in an improved and expeditious manner, while contoured articles are being produced from the sheet stock in improved manner and at high production rate without skilled personnel attention. The machine of the invention requires substantially less floor space than prior art machines because of the compact arrangement of its functional components.

Generally stated, the machine includes improved means for suspending sheets of material to be molded in horizontal disposition, and for heating the sheets to render them plastic while so suspended. The heated plastic sheet is then draped over a mold or molds which rest upon a horizontally disposed vacuum table. The sheet is then formed to the mold contourings by operation of the vacuum table; and is then cooled to a substantially rigid state prior to removal from the mold. The stock sheet handling system during transport and heating and processing allows the sheet to move through the process without undesirable deformation; whereby no skilled attention to operation of the machine is required.

The functional components of the machine comprise basically a stock sheet roll support; a stock sheet transport frame; a heater dome; a combination vacuum table and mold support; and a product delivery table. The sheet transport frame includes cam locks alternately engaging and disengaging the edges of the stock sheet of material to be molded; and is vertically shifted on a vertical track system between upper and lower operative positions. The frame is also reciprocable on a horizontal track system for intermittent advancements of successive sections of the stock material from the supply roll through the transport frame and into operative position under the heater dome and over the vacuum table, and finally into discharge position over the delivery table.

DETAILED DESCRIPTION

By way of example, an embodiment of the invention is illustrated herein to comprise a compact, floor-mounted machine unit; the functional features of the machine being illustrated by the accompanying drawing wherein:

THE DRAWING

Figure 2:
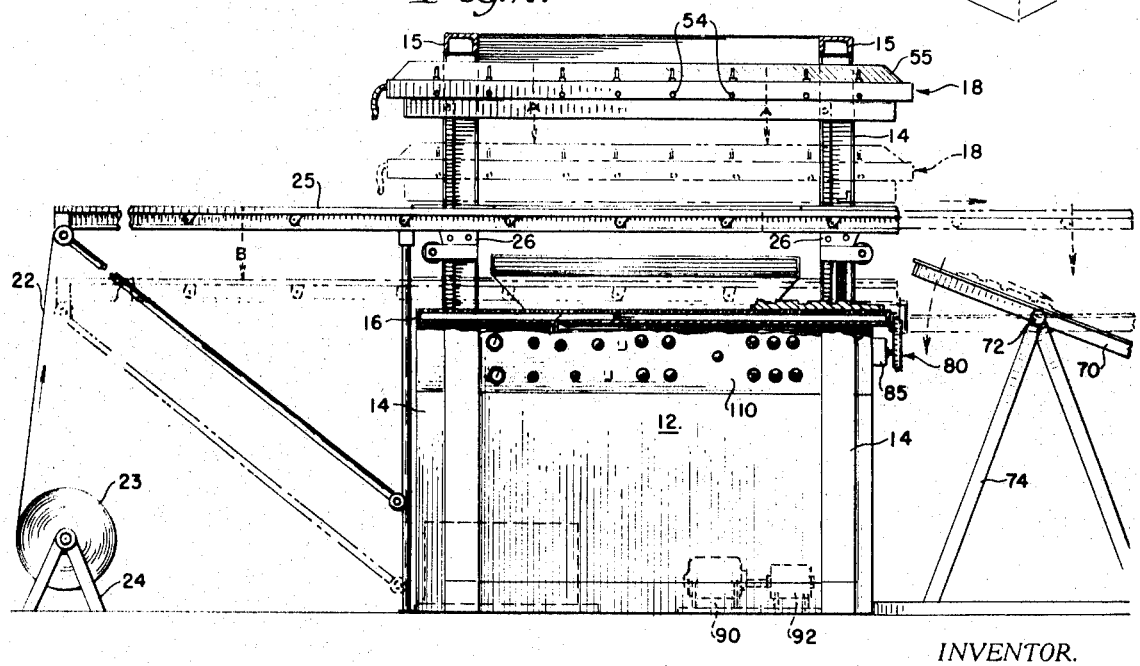
Figure 8:
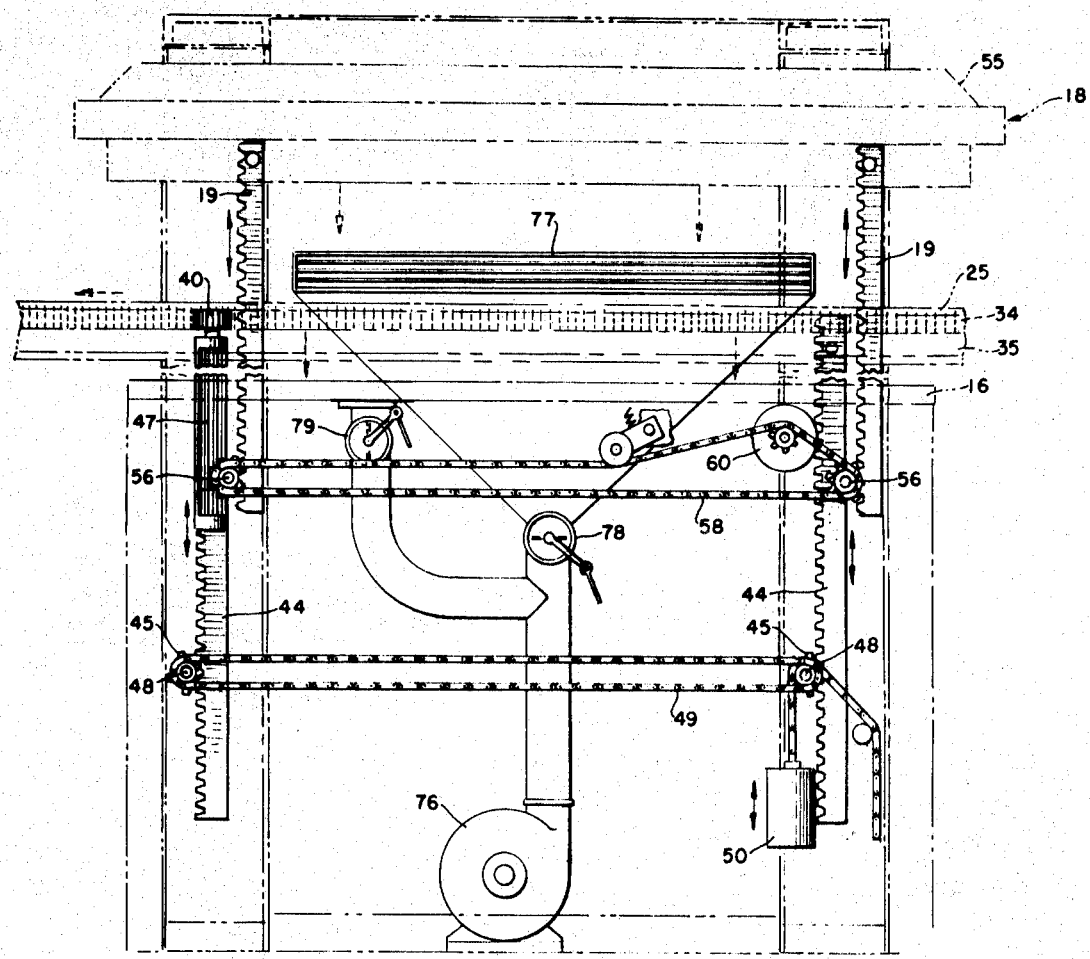
Figure 9:
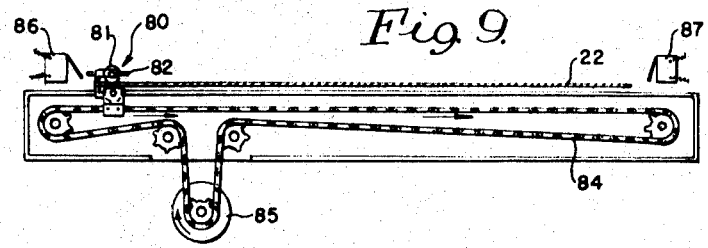

FIG. 1 is a perspective view of a machine of the invention;
FIG. 2 is a side elevational view thereof;
FIGS. 3-4 are enlarged scale fragmentary views, partly in section, of the representative area designated 3-4 in FIG. 2; illustrating operation of the transport frame cam locks;
FIG. 5 is a section taken on line 5—5 of FIG. 3;
FIG. 6 is a fragmentary perspective view illustrating the transport frame elevational and advancement travel drive systems;
FIG. 7 is a fragmentary vertical sectional view through the vacuum table and delivery table components of the machine; showing a section of stock sheet disposed upon a mold resting upon the vacuum table, and section of finished molded product resting on the delivery table;
FIG. 8 is a vertical sectional view showing the heat canopy and transport frame elevator drive systems; and
FIG. 9 is a fragmentary sectional view showing the stock sheet cutter drive system.

As shown herein, a machine of the present invention may be constructed to comprise generally, a machine housing 12 of generally rectangular form mounting an open framework consisting of upright posts 14 at the four corners thereof interconnected by top sills 15. The housing 12 supports a horizontally disposed vacuum table 16 and houses the machine component drive and control mechanisms, as will be explained hereinafter. The heat dome is illustrated generally at 18, and as best shown in FIG. 8 is vertically supported by gear rack bars 19 which in turn are slidably mounted on the posts 14 and are driven to reciprocate by gears 20, as will be explained hereinafter. The stock sheet material to be processed is indicated at 22, and is conveniently furnished from a roll 23 carried on a wheel stand 24 (FIGS. 1-2). The sheet transport frame is shown to comprise a pair of cooperating rail systems extending along opposite edges of the stock sheet; each rail system being slidably enclosed within a horizontally disposed channel 25 which is in turn carried by brackets 26 which slide vertically on the machine frame posts 14.

As best shown at FIGS. 3, 4, 5, the sheet transporting rail systems each consist of three cooperating traveller bars 34, 35, 36, which are slidably enclosed within the channel sectioned rail 25 extending along each edge of the stock sheet 22 as it is drawn off the supply roll and over a roller as shown at 37. The upper bars 34 pivotally carry links 38 which extend into pivotal connection with the cam bars 35; and the parts are so dimensioned and arranged that when the members 34 are displaced to the right as viewed in FIGS. 1-2 (or to the left as viewed in FIGS. 3-4) they cause the links 38 to press cam bars 35 against the edges of the stock sheet 22 so as to firmly grip the stock between the cam bars 35 and the slide bars 36. As stated, the channels 25—25 are carried by the posts 14 at the four corners of the machine so as to be vertically slidably thereon, while the traveller bar members 34, 35, 36, are longitudinally slidable within the channels 25.

As shown at FIG. 6, the channels 25 are cut away to permit spur gears 40 to engage gear rack teeth 42 formed on the bar members 34. Thus, rotations of the spur gears 40 will result in longitudinal displacements of the members 34 relative to the housing channels 25. When the members 34 are thus driven towards the right (FIGS. 1, 2), or towards the left (FIGS. 3, 4, 6) the bars 35 will be cammed by the levers 38 downwardly so as to engage the edges of the sheet 22 between bars 35–36, and will carry it along from left to right as shown in FIGS. 1, 2. Reverse operation of the gears 40 will cause the members 35 to lift free of the sheet 22 and retract towards the left while leaving the sheet in its previously advanced position. Thus, it will be understood that alternately reverse direction operation of the gears 40 will cause the sheet 22 to be intermittently advanced through the transport frame system at the desired degree of displacement from the supply roll 23.

The vertical support system for the transport frame relative to the posts 14 is controlled by a rack and pinion system at each end of the machine; the racks being shown at 44 and the pinions at 45. The upper ends of the racks 44 are fixed to the transport frame channels 25 as indicated at 46 (FIG. 6) and thus provide support for the rail system at the four corners of the machine. The gears 40 are journalled on the upper ends of the racks 44 and are arranged to be driven by vertically splined drive shafts 47 as will be explained hereinafter (FIG. 6). The gears 45 are carried by drive shafts 48—48 which are synchronized in rotation by a chain and sprocket system 49; and a counterweight 50 is operative through a loose chain 52 and sprocket 53 to bias the chain and gear rack system at all times so as to cause the transport frame to rise to its solid line position as shown in FIGS. 1, 2.

The heater dome 18 preferably includes a plurality of horizontal and parallel disposed quartz infra red lamps or other radiant heat source means or the like as indicated at 54 (FIG. 2) extending transversely beneath a suitable reflector canopy 55; the assembly being fabricated generally in the form of a rectangular frame and mounted so as to be vertically movable within the frame work defined by the posts 14 between the solid line position and broken line position thereof shown in FIG. 2. The elevational disposition of the heat canopy is controlled by the rack systems 19 at the four corners thereof which are actuated by gears 56 driven by chains 58 and a hydraulic motor 60 (FIG. 8).

The product delivery component is illustrated to comprise a flat table-like member 70 which is pivotally mounted as indicated at 72 (FIGS. 1, 2) upon a suitable stand 74. The table top member 70 is balanced so as to tend to tilt to the inclined position thereof shown in FIGS. 1, 2, so as to be adapted to slide-discharge products thereon into a bin or the like as indicated at 75. However, the parts are so dimensioned and arranged that whenever the sheet transport frame 25 lowers so as to deposit the sheet stock upon the molds as illustrated at FIG. 7, the discharge table 70 is thereby rocked into a horizontal attitude and in top surface continuity with the top surface of the vacuum table.

An air blower as shown at 76 (FIG. 8) is arranged to alternately supply the vacuum table 16 and a louvered cooling air discharge manifold 77 with cooling air; the discharge arrangement being controlled by valves 78–79 in the air duct system for purposes to be explained hereinafter. As best shown at FIGS. 7, 9, a stock sheet cutting knife mechanism as indicated generally at 80 is provided for severing a previously formed section of sheet material from the incoming sheet material and release of the formed product for discharge over the delivery table 70. This mechanism consists of a pair of rotary knife blades 81 mounted on a bracket 82 which is carried by a chain 84 driven by a hydraulic motor 85 so as to alternately drive the knife unit back and forth across the path of advance of the stock sheet so as to sever the latter. Micro switches as shown at 86–87 control reciprocal movements of the knife unit.

The functional components of the machine are operatively energized by a prime power electric motor 90 (FIG. 2) which drives a hydraulic pump 92 which in turn powers separate hydraulic motors driving the functional components of the machine. For example, the motor for driving the transport frame to advance and retract is indicated at 100 (FIG. 6) and operates through a chain 101 to drive a shaft 102 which carries a pair of worm gears 104—104 engaging the splined shafts 47—47 which power the gears 40—40. The motor driving the heat dome to raise and lower is indicated at 60. The motor driving the vacuum pump is not shown; being unnecessary in the interests of simplification of this specification. The motor indicating the sheet cutting knife is indicated at 85.

Operation of the electrical and hydraulic motors of the system, and energization of the heat lamps and operation of the cooling air blower may of course be either manually and separately controllable, or automatically controlled in predetermined time-sequenced relation by means of a control system including suitable time relays and the like. In any case the machine attendant simply places an appropriate mold arrangement on top of the vacuum table and then depresses the "start" button on the control panel which is illustrated at 110 (FIGS. 1, 2). The control system thereupon operates to energize the heat lamps. The heat dome elevator motor 60 is then actuated so as to cause the heat dome to descend into a position in close proximity just above the stock sheet section which is disposed within the framework of the machine.

Following a suitable time lapse, insuring proper heating and softening of the stock sheet, the heat dome elevator motor is again energized so as to lower still further and press against the transport frame so as to depress the latter against the action of the counterweight 50. The transport frame unit is thereby lowered, while the heater remains in close proximity to the stock sheet, to such a position that the softened stock sheet portion is now draped over the mold pattern on the vacuum table. Thus, the sheet is positively maintained in ideally heated condition until it is delivered to the pattern molding device. At this point the vacuum source is brought into operation to withdraw air from within the vacuum table, as through outlet 112 (FIG. 7) so that the softened sheet material is drawn snugly down around the mold and against the top surface of the vacuum table. The blower valve control system is then shifted so as to cause cooling air to be blown laterally through the machine and over the top surface of the molded sheet stock, thereby accelerating the setting of the sheet material in its molded form.

The motor controlling oscillation of the transport frame is then actuated so as to retract the transport frame toward the left as viewed in FIGS. 1, 2, 7 and 8; the transport frame being automatically released from the edges of the stock sheet as explained hereinabove, whereby the molded stock section remains in locked position upon the mold. The length of retract travel of the transport frame is adjustably controlled as may be desired. The motor driving the cut-off knife unit 80 is then operated to cause the knife to traverse and sever the stock sheet from the previously molded section (FIG. 7). The heat dome elevator motor 60 is then operated to raise the dome frame to its upper position as illustrated at FIGS. 1, 2, 8. This permits the transport frame to rise in response to operation of its counterweight to the position shown in FIGS. 1–2. The vacuum supply is then cut off and air from the blower is simultaneously introduced into the vacuum table manifold and blows the molded sheet section upwardly off the mold.

The transport frame oscillating motor 100 is then operated to displace the transport frame to the right, whereupon the frame members automatically grip the edges of the stock sheet and drag a new section of stock sheet toward the right and into operative position. When the transport frame 25 rises, it releases the left hand end of the discharge table 70, whereupon the latter pivots in clockwise direction as shown in FIGS. 1, 2, and discharges the preformed section into the receiving bin 75. The machine operational cycle is then repeated as set forth hereinabove.

I claim:

1. A thermoplastic sheet molding machine comprising: a vacuum table having a perforated top surface portion adapted to support in resting relation thereon a molding pattern device, post means extending vertically from adjacent the four corner portions of said vacuum table, a stock sheet transport frame unit comprising a pair of parallel guide rails mounted respectively upon oppositely paired of said post means so as to be vertically movable thereon between a stock sheet transport elevation and a stock sheet-to-mold delivering elevation, and clamp means carried by each of said guide rails so as to be horizontally reciprocable thereon in the plane of stock sheet travel through the machine, said clamp means being operable to alternately clamp upon and disengage relative to the respective side edges of the stock sheet whereby the latter may be tarnsported in response to successive advancements of the clamp means in the intended direction of stock sheet transport, a radiant heater device carried by said post means above said transport frame and arranged to be movable vertically on said post means, motor means for driving said transport frame clamp means to reciprocate horizontally in the direction of stock sheet travel through the machine, means operatively coupled to said guide rails and operable to cause the latter to move vertically on said post means between said transport elevation and said delivering elevation, motor means coupled to said heater device and operable to move the latter alternately upwardly and downwardly on said post means, and air blower means delivering to a conduit system selectively controllable and arranged to alternately blow cool air across the top of a molded stock sheet and into the interior of said vacuum table whereby to lift the molded and cooled stock sheet away from the molding pattern device, said means for moving said guide rails vertically on said post means comprising a counterweight operatively coupled to said guide rails and operable to bias the latter to move upwardly on said post means toward said transport elevation, said heater device including means adapted to engage said transport frame unit upon lowering of said heater device so as to force said frame unit to lower against the action of said counterweight while said heater device is disposed in close heating relation with stock sheet material supported between said clamp means, whereby to force said frame unit to lower the heated stock sheet into draped relation upon a molding pattern device supported by said vacuum table.

2. A thermoplastic sheet molding machine comprising:

a vacuum table having a perforated top surface portion adapted to support in resting relation thereon a molding pattern device, post means extending vertically from adjacent the four corner portions of said vacuum table, a stock sheet transport frame unit comprising a pair of parallel guide rails mounted respectively upon oppositely paired of said post means so as to be vertically movable thereon between a stock sheet transport elevation and a stock sheet-to-mold delivering elevation, and clamp means carried by each of said guide rails so as to be horizontally reciprocable thereon in the plane of stock sheet travel through the machine, said clamp means being operable to alternately clamp upon and disengage relative to the respective side edges of the stock sheet whereby the latter may be transported in response to successive advancements of the clamp means in the intended direction of stock sheet transport, a radiant heater device carried by said post means above said transport frame and arranged to be movable vertically on said post means, motor means for driving said transport frame clamp means to reciprocate horizontally in the direction of stock sheet travel through the machine, means operatively coupled to said guide rails and operable to cause the latter to move vertically on said post means between said transport elevation and said delivering elevation, motor means coupled to said heater device and operable to move the latter alternately upwardly and downwardly on said post means, and air blower means delivering to a conduit system selectively controllable and arranged to alternately blow cool air across the top of a molded stock sheet and into the interior of said vacuum table whereby to lift the molded and cooled stock sheet away from the molding pattern device, said clamp means at opposite sides of said machine each comprising a pair of cam bars and a slide bar extending in slidable relation within said guide means at opposite sides of said machine, said cam bars being interconnected by cam levers, and one of said cam bars being arranged to be driven to reciprocate longitudinally whereby to alternately cam the other of said bars towards the associated slide bar for gripping an edge of the stock sheet therebetween for advancing the sheet through the machine, and then releasing the sheet during the transport frame retract movement.

3. A thermoplastic sheet molding machine as set forth in claim 2 wherein one of said pair of said cam bars is provided with gear rack means extending longitudinally thereof for driving engagement with gear means operably coupled to said clamp means driving motor means.

4. A thermoplastic sheet molding machine comprising:

a vacuum table having a perforated top surface portion adapted to support in resting relation thereon a molding pattern device, post means extending vertically from adjacent the four corner portions of said vacuum table, a stock sheet transport frame unit comprising a pair of parallel guide rails mounted respectively upon oppositely paired of said post means so as to be vertically movable thereon between a stock sheet transport elevation and a stock sheet-to-mold delivering elevation, and clamp means carried by each of said guide rails so as to be horizontally reciprocable thereon in the plane of stock sheet travel through the machine, said clamp means being operable to alternately clamp upon and disengage relative to the respective side edges of the stock sheet whereby the latter may be transported in response to successive advancements of the clamp means in the intended direction of stock sheet transport, a radiant heater device carried by said post means above said transport frame and arranged to be movable vertically on said post means, motor means for driving said transport frame clamp means to reciprocate horizontally in the direction of stock sheet travel through the machine, means operatively coupled to said guide rails and operable to cause the latter to move vertically on said post means between said transport elevation and said delivering elevation, motor means coupled to said heater device and operable to move the latter alternately upwardly and downwardly on said post means, and air blower means delivering to a conduit system selectively controllable and arranged to alternately blow cool air across the top of a molded stock sheet and into the interior of said vacuum table whereby to lift the molded and cooled stock sheet away from the molding pattern device, said means for moving said transport frame guide rails vertically on said post means comprising a counterweight operatively coupled through a chain and sprocket and gear and rack mechanisms to said guide rail unit so as to be operable to bias the latter at all times to move upwardly on said post means toward said transport elevation, and the elevation of said heater device on said post means being controlled by motor means operating through a second chain and sprocket and gear and rack mechanism so as to shift the heater device between its uppermost inoperative elevation, an intermediate heating elevation, and a lowermost operative elevation, whereby upon lowering of said heater device towards its lowermost operative elevation it forces said transport frame unit to lower against the action of said counterweight while said heater device is disposed in close heating relation with stock sheet material supported between said clamp means while forcing said frame unit to lower the heated stock sheet into draped relation upon a molding pattern device supported by said vacuum table.

References Cited

UNITED STATES PATENTS

| | | | |
|---|---|---|---|
| 2,431,048 | 11/1947 | Kilborn | 18—16 H |
| 2,836,852 | 6/1958 | Butzko | 18—19 F |
| 2,874,751 | 2/1959 | Norton. | |
| 3,025,566 | 3/1962 | Kostur | 18—16 R X |
| 3,518,334 | 6/1970 | Carrigan et al. | 18—19 R X |

ROBERT L. SPICER, JR., Primary Examiner